(12) United States Patent
Barton (10) Patent No.: US 6,501,195 B1
(45) Date of Patent: Dec. 31, 2002

(54) DEVICE FOR CONTROLLING POWER DISTRIBUTION TO SUBSYSTEMS

(75) Inventor: Bruce Barton, Huntington, NY (US)

(73) Assignee: Bits LTD, Northport, NY (US)

( * ) Notice: Subject to any disclaimer, the term of this patent is extended or adjusted under 35 U.S.C. 154(b) by 7 days.

(21) Appl. No.: 09/597,666

(22) Filed: Jun. 21, 2000

(51) Int. Cl.[7] .............................................. H01H 47/00
(52) U.S. Cl. ....................................... 307/125; 307/38
(58) Field of Search ........................... 307/38, 115, 125

(56) References Cited

U.S. PATENT DOCUMENTS

| | | | | |
|---|---|---|---|---|
| 3,416,001 A | * | 12/1968 | Fistell .......................... | 307/38 |
| 4,054,802 A | * | 10/1977 | Mock .......................... | 307/38 |
| 4,255,669 A | * | 3/1981 | Naugle ........................ | 307/131 |
| 4,395,640 A | * | 7/1983 | Bone .......................... | 307/115 |
| 4,659,941 A | * | 4/1987 | Quiros ........................ | 307/11 |
| 4,674,031 A | * | 6/1987 | Siska, Jr. ..................... | 700/79 |
| 4,675,537 A | * | 6/1987 | Mione ......................... | 307/38 |
| 4,731,549 A | * | 3/1988 | Hiddleson ................... | 307/125 |
| 4,970,623 A | * | 11/1990 | Pintar .......................... | 361/187 |
| 5,541,457 A | * | 7/1996 | Morrow ....................... | 307/38 |
| 5,565,714 A | * | 10/1996 | Cunningham ............... | 307/112 |
| 5,579,201 A | * | 11/1996 | Karageozian ................ | 361/119 |
| 5,615,107 A | * | 3/1997 | DeAngelis ................... | 700/12 |
| 5,747,973 A | * | 5/1998 | Robitaille et al. ........... | 323/239 |
| 5,923,103 A | * | 7/1999 | Pulizzi et al. ............... | 307/126 |

* cited by examiner

Primary Examiner—Brian Sircus
Assistant Examiner—Sharon Polk
(74) Attorney, Agent, or Firm—I. Zborovsky (57) ABSTRACT

A device for controlling a power distribution to subsystems which has a power input to be connected to a power source, a primary power output to be connected to a primary device, at least one secondary power output to be connected to at least one secondary device; sensing unit for sensing when a current level falls below a threshold in response to the primary device being turned off and when the level current raises above a threshold in response to the primary device being turned on; and executing unit operatively connected with the sensing unit and operative for interrupting a power supply to the at least one secondary device when the sensing unit sense the current level below the threshold and supplying power to the at least one secondary device when the sensing unit sense the current level above the threshold correspondingly; and means for limiting voltage across said sensing means so as to limit heat produced by said sensing means but at the same time to allow tripping of said sensing means.

15 Claims, 11 Drawing Sheets

DEVICE FOR CONTROLLING POWER DISTRIBUTION TO SUBSYSTEMS

TECHNICAL FIELD

The present invention relates to devices for controlling a distribution of power to subsystems, for example to a main device and at least one secondary device or a plurality of secondary devices.

More particularly, the present invention relates to the above mentioned devices formed as electrical power strips and power control sensors which can be used with new devices having two modes of operation, standby or off and full on, with the use of main device or secondary devices.

BACKGROUND ART

One type of an electrical distribution device is the power strip or power control center, which generally comprises of a row of power outlets, switched or unswitched, to distribute power to a primary device and secondary device(s) from a standard outlet (e.g., wall outlet). Some power strips and control centers contain options like circuit breakers, fuses and/or surge protectors, for example.

In newer personal computers the system can turn itself off and is controlled by the operating system. During the system shutdown, there is a delay in which the operator must wait for the system to finish before turning off the secondary device(s). Depending on the operating software and programs, this can be a long time. Using this invention, the user may leave after the shutdown is started. When the system finishes and switches off or to the standby mode, the secondary device(s) will be turned off.

When used with computer devices, each device is plugged into a separate outlet with the computer plugged into the main outlet. When the computer is turned on, the current level increases to a high enough level to turn on the secondary device(s). Other constant power outlets may also be included for wake up devices, such as modems capable of bringing the system out of standby mode.

Figure 2:
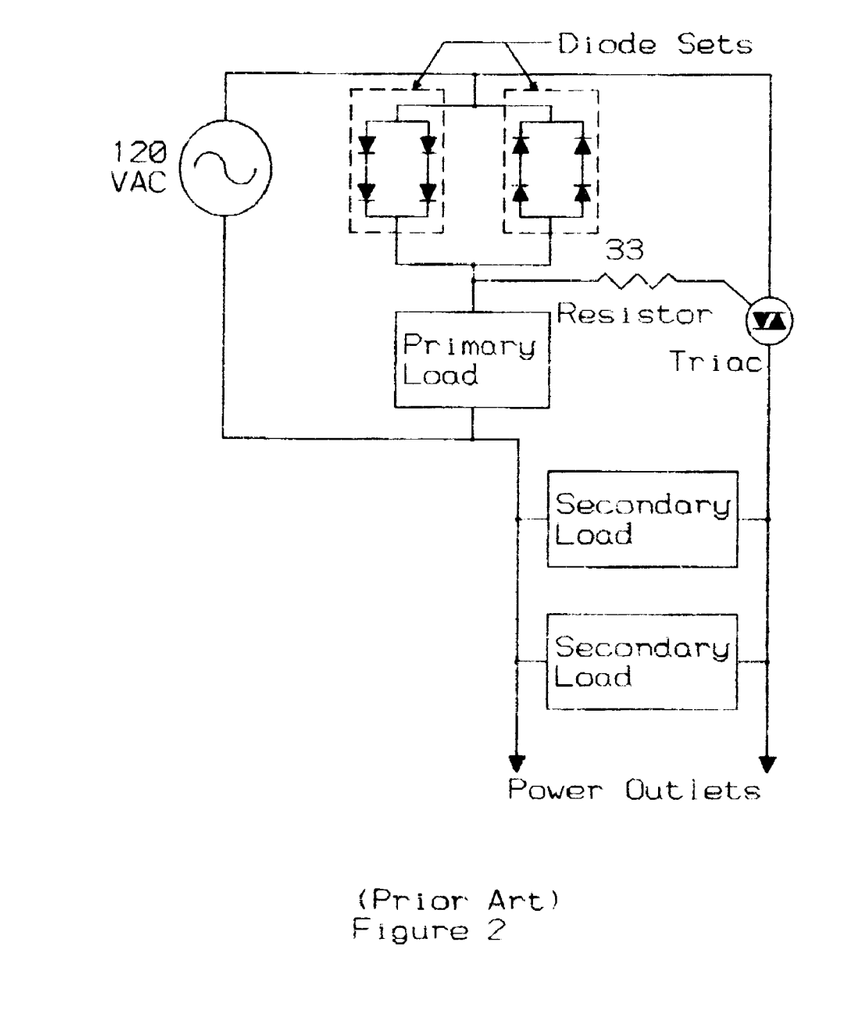
FIG. 2 is a view showing a distribution control device in accordance with the prior art.

U.S. Pat. No. 4,659,941 discloses a power strip where the main outlet current controls the secondary device(s) as shown in FIG. 2. Here, the secondary switch and trigger device are the same. In this configuration, the main device must draw current at the start of each cycle of line power for the triac to trigger correctly. With high efficiency supplies, this is never the case because they only draw power during the peak voltage of the line power. So, when used with a PC or newer video/audio equipment, the voltage to the secondary outlets will not be a sine wave like the voltage from the wall outlet. This waveform can damage the secondary device(s). The second problem is personal computers and newer video/audio equipment do not turn off completely, but remain in a standby mode so they can turn themselves on at a given time or occurrence. Because of this, the secondary device(s) will never be turned off, defeating the purpose of the power strip's use.

U.S. Pat. Nos. 4,731,549 and 4,970,623 are methods for controlling secondary device(s). Both require internal power supplies and many components, making them too expensive for mass production and difficult to fit in a standard power strip.

DESCRIPTION OF THE INVENTION

Accordingly, it is an object of present invention to provide a device for controlling distribution of power to subsystems, which avoids the disadvantages of the prior art.

In keeping with these objects and with others which will become apparent hereinafter, one feature of present invention resides, briefly stated, in a device for controlling a power distribution to subsystems which has a power input to connected to a power source, a primary power output to be connected to a primary device, at least one secondary power output to be connected to at least one secondary device; sensing means for sensing when a current level falls below a threshold in response to the primary device being turned off and when the level current raises above a threshold in response to the primary device being turned on; executing means operatively connected with said sensing means and operative for interrupting a power supply to said at least one secondary device when the sensing means sense the current level below the threshold and supplying power to said at least one secondary device when said sensing means sense the current level above the threshold; and means for limiting voltage across said sensing means so as to limit heat produced by said sensing means but at the same time to allow tripping of said sensing means.

In accordance with a further feature of present invention, the inventive device further has time delay means which is located between said sensing means and said executing means and is operative for delaying interruption of power supply or supply of power to the at least one secondary device in response to the sensing of the current level below the threshold or above the threshold by the sensing means correspondingly. The time delay means can be formed as a capacitor and resistors arranged between the sensing means and the executing means.

In accordance with a further embodiment of the present invention, the sensing means can be formed as a current sensing resistor arranged in series with a power input of the device and a triac connected to the resistor, for example through another resistor.

The executing means can be formed for example as a solid state DC relay, as an AC mechanical relay, as a solid state AC relay, etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BEST MODE OF CARRYING OUT THE INVENTION

Figure 1:
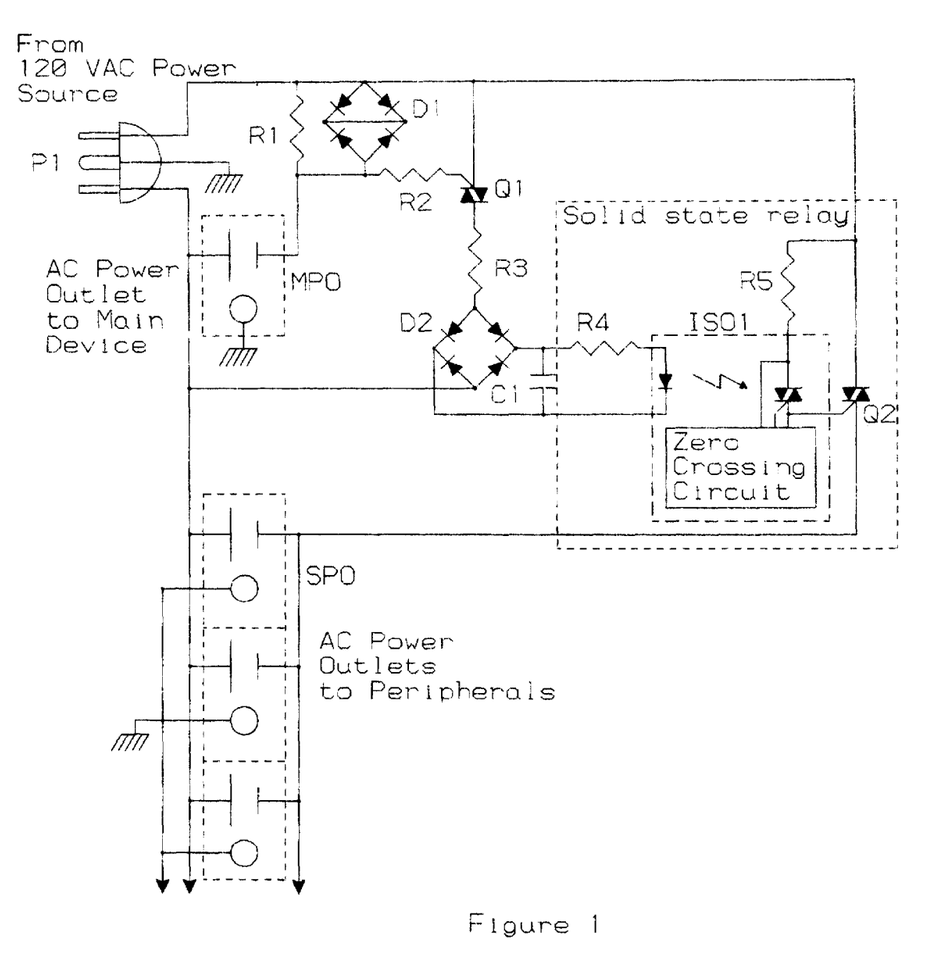
FIG. 1 is a view showing a device for controlling a power distribution to subsystems in accordance with one embodiment of the present invention.

A device for distributing power to subsystems in accordance with one embodiment of the present invention as shown in FIG. 1 has a power input (PI) which is connectable to an AC power source. A current sensing resistor (R1) converts the current drawn by a main system or device connected to a main power output (MPO), into a voltage. The current sensing resistor (R1) is arranged in series with the main power output (MPO). Diodes (D1) are placed in parallel with the resistor (R1) to limit the power to the resistor, by limiting the voltage on the resistor to two diode drops or about 1.2 volts. The diodes (D1) are placed in both directions because the current through the resistor (R1) may be alternating.

When the voltage across the current sensing resistor, created by the main device power level, exceeds the gate trigger voltage of the triac (Q1), a current flows through the gate protection resistor (R2) and the gate of the triac (Q1). Current through the gate of the triac(Q1) will cause the triac(Q1) to switch on. Current now flows through the triac (Q1), current limiting resistor (R3), and the bridge rectifier (D2) to charge the capacitor (C1). The current limiting resistor (R3) limits the current to the triac (Q1) and the bridge rectifier (D2) as well as forming a resistive capacitive time constant to slow down the charging of the capacitor (C1). This helps prevent false triggers as well as creating a turn on time delay for secondary systems system(s), if wanted.

The energy now stored in capacitor (C1) turns on a relay to control power supply to secondary power outputs (SPO), to which the secondary system (device) or secondary systems (devices) are connected. Even though a mechanical relay can be used, a solid state relay is preferred for reliability and because it can contain a zero crossing detector to help with the secondary surge turn on current. The energy stored in capacitor (C1) will keep the relay on during the times when triac (Q1) is off due to the non full wave current use characteristics of the main device. The energy stored in capacitor (C1) can also be used for full wave triggering of the secondary device(s) even when the main device uses only a half cycle of each full cycle of the incoming power and for creating a time delay when turn off power to the secondary devices.

In the solid state relay the current limiting resistor (R4) protects the optical isolator's (ISO1) input diode from the voltage on the capacitor (C1). When current from the capacitor (C1), through the resistor (R4), to the input diode of the optical isolator (ISO1) becomes large enough it will turn on the optical isolator (ISO1). The resistor (R4) also forms the turn off resistive capacitive time constant with the capacitor (C1) by limiting the discharge current. This allows the turn off time of the optical isolator (ISO1) and the secondary system(s) to be delayed.

The optical isolator (ISO1) may contain a zero cross detector to help with turn on surge currents of the secondary device(s) and help prevent noise spikes. The output of the optical isolator (ISO1) is connected to the gate of the triac (Q2). When the optical isolator (ISO1) turns on, it triggers the triac (Q2) supplying power to the secondary power outlet(s). With power now applied the secondary device(s) will now turn on. An optional protection resistor (R5) or fuse may be placed in series with the output of the optical isolator (ISO1) for safety.

In the above described embodiment the current sensing resistor (R1) together with the triac (Q1) constitute sensing means which sense a current level below or above a predetermined threshold, while the solid state relay constitutes executing means which, in response to the sensing of the current level by the sensing means interrupts the current supply to the secondary device(s) when the sensed level is below the threshold as a result of turning off of the primary device or supplies the current to the secondary device(s) when the current level sensed by the sensing means is above the threshold as a result of turning on of the primary device.

Figure 3:
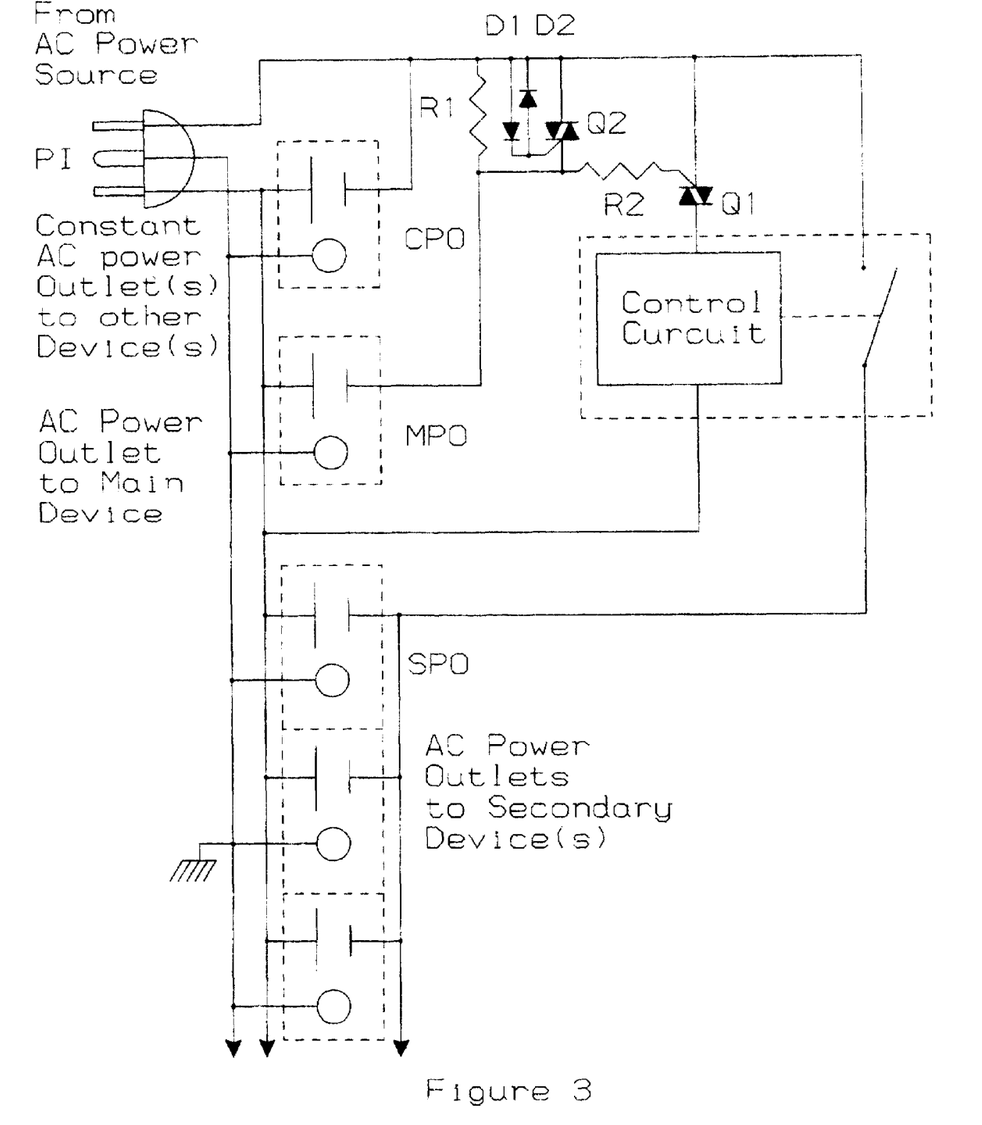
FIG. 3 is a view showing a next embodiment of the inventive device.

FIG. 3 shows another embodiment of the device with means for limiting the power to the resistor (R1). The power limiting means include the triac (Q2) which is connected parallel to the resistor R1 and limits the voltage across the current sensing resistor (R1). The power limiting means also include diode means (D1, D2) arranged between the resistor (R1) and the triac (Q2) to ensure that first the triac (Q1) switches the control circuit to the secondary outlet, and thereafter the triac (Q2) limits the voltage across the resistor (R1).

The current sensing resistor (R1) is placed in series with the control outlet converting the current drawn by the main device to a voltage. In operation, when the voltage across the current sensing resistor, created by the main devices power level, exceeds the gate trigger voltage of the triac (Q1), a current flows through the gate protection resistor (R2) and the gate of the triac (Q1). Current through the gate of the triac (Q1) will cause the triac (Q1) to switch on and turn on the control circuit for the secondary outlets. As the current through the sensing resistor (R1) continues to increase, the voltage across it also continues to increase. When the voltage reaches a predetermined level, for example about 1.2 volts, the gate trip voltage of the triac (Q2) plus the diode (D1 or D2) voltage drop, the triac (Q2) will trigger. The triac Q2 will limit the voltage across the current sensing resistor to about 0.6 volts and limit the heat produced by the total circuit. Two diodes (D1 and D2) are used because the current may be alternating. The control circuit can be one of many types.

By using a triac as the power limiting device, the voltage drop across the current sensing circuit can be limited to about 0.6 volts. At 15 amperes, the typical full power rating for most power strips, a 0.6 voltage drop results in a power dissipation of 9 watts. The lower power dissipation allows the circuit to be built in a smaller enclosure. The diodes (D1 and D2) in series with the gate of the triac (Q2) allow the voltage across the current sense resistor (R1) to rise to a high enough level to trigger the current sense circuit (R2 and Q1) before turning on the triac (Q2).

Since the voltage across the sensing resistor (R1) is limited, the heat produced by the sensing means is also limited, and smaller enclosures are possible.

FIG. 3 embodiment also includes a constant power outlet (CPO) which is always supplied with power when the device is plugged in, even when the other outlets are switched off.

Figure 4:
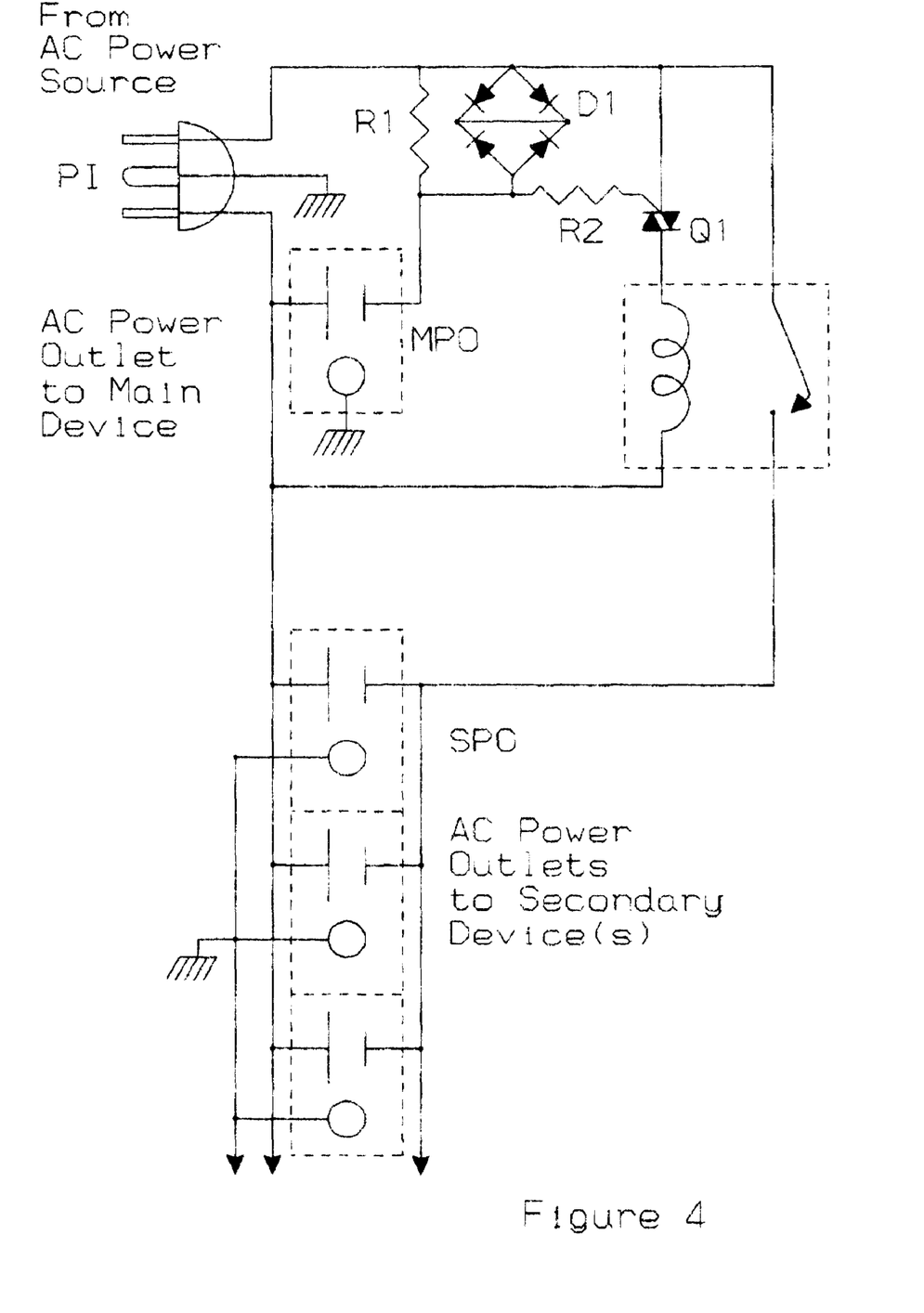
FIG. 4 is a view showing the inventive device in accordance with another embodiment of the present invention.

FIG. 4 shows another embodiment of the inventive device. It substantially corresponds to the embodiment of FIG. 1. However, in the device in accordance with the embodiment of FIG. 4, the output of the triac (Q1) is connected directly to the relay. The relay can be a mechanical relay or a solid state relay.

Figure 5:
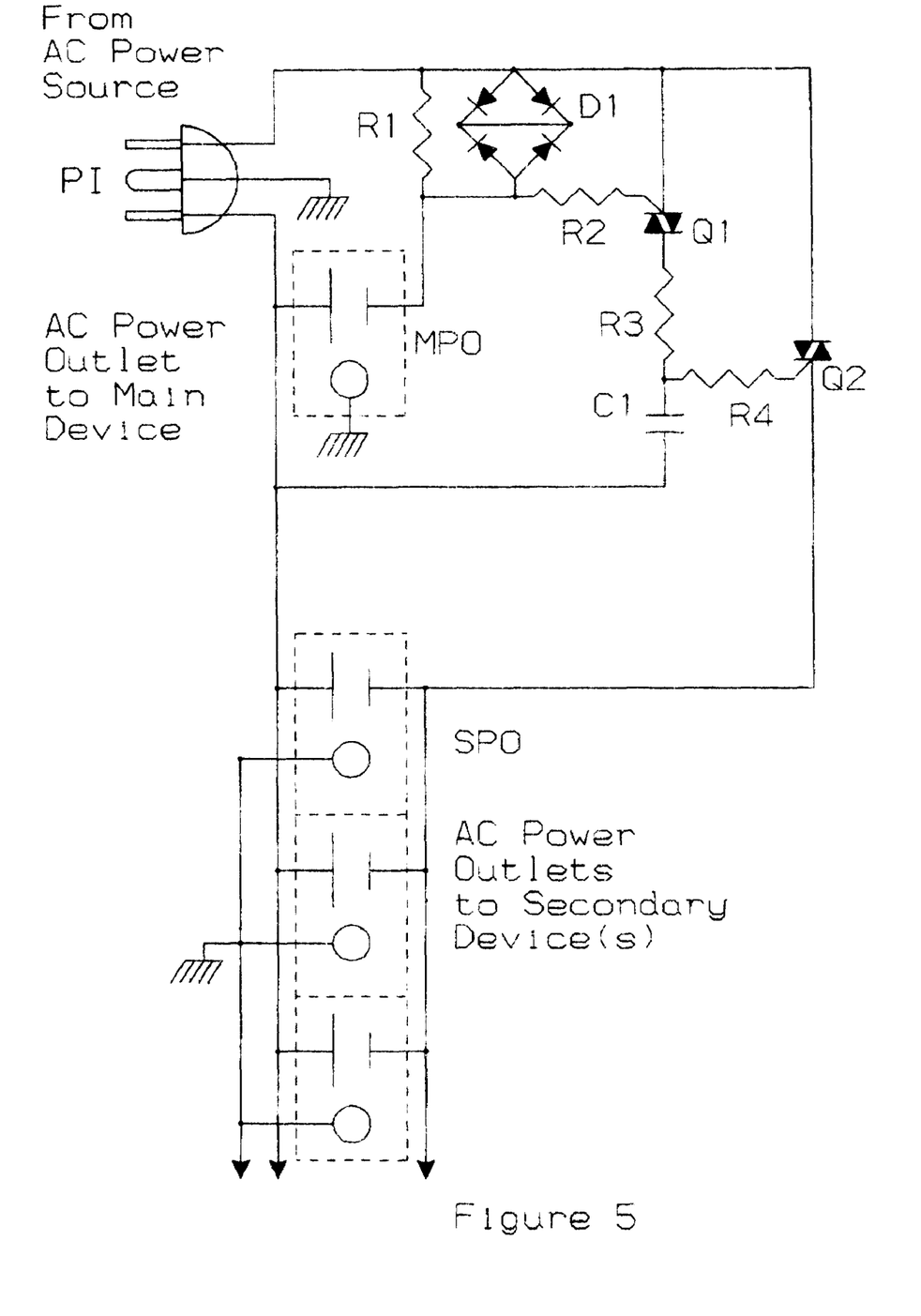
FIG. 5 is a view showing the inventive device in accordance with still a further embodiment of the present invention.

FIG. 5 shows another embodiment of the device in accordance with the present invention. In this embodiment the output of the triac (Q1) is phased shifted to drive the triac (Q2) directly. Here the current limiting resistor (R3) the phase shifting capacitor (C1), the current limiting resistor (R4) and the second triac (Q2) together form a solid state AC relay.

Figure 6:
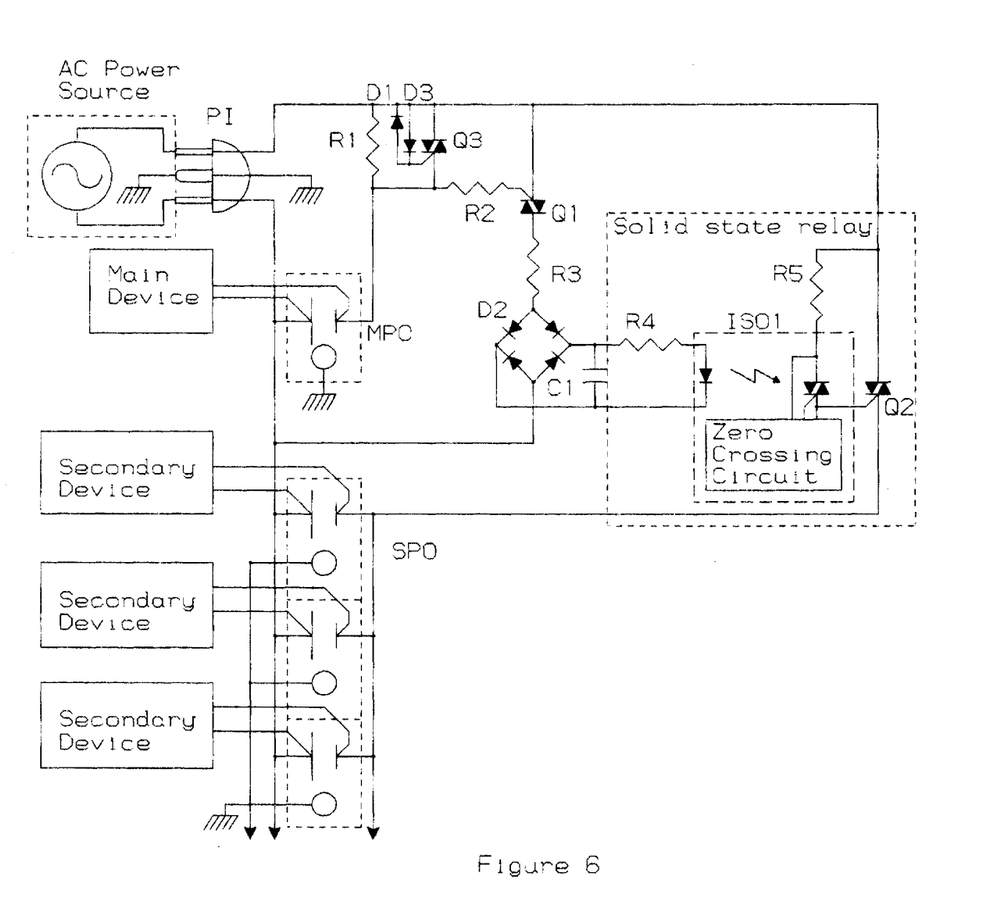
FIG. 6 is a view showing the inventive device with a power source, a main subsystem and secondary subsystems.

FIG. 6 shows another embodiment of the inventive device connected to an AC power source, the main device and the secondary devices.

Figure 7:
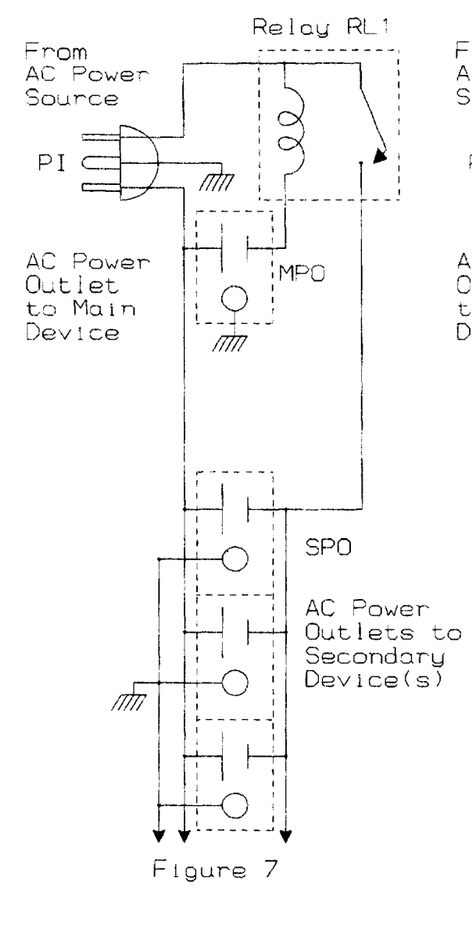
FIG. 7 is a view showing the inventive device in accordance with still another embodiment of the present invention.
Figure 8:
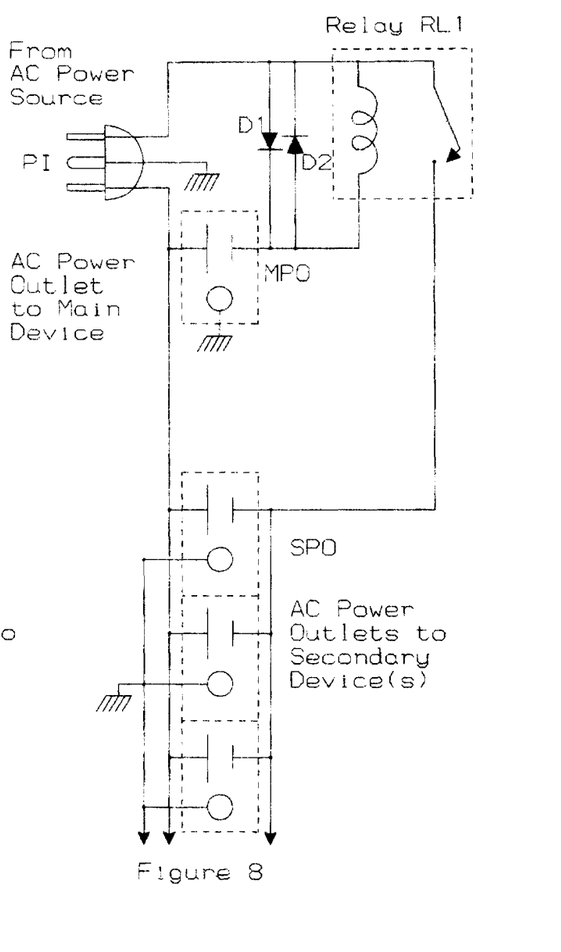
FIG. 8 is a view substantially corresponding to the view of FIG. 7, but showing a modification of the inventive device of FIG. 7.

FIG. 7 shows a further embodiment of the device in accordance with the present invention. Here a mechanical current driven relay (RL1) is used to control the secondary device (S). When the magnetic field reaches a threshold determined by the mechanical configuration of the relay (RL1), the relay (RL1) will close. When the relay (RL1) closes, it supplies power to the secondary device (S). The windings of the relay (RL1) are of a low impedance, so that the functioning of the primary device is not affected. For safety purpose, the windings should be able to handle the full rated current of the power strip. Alternatively, limiting protection devices can be used as shown in FIG. 8. In this figure the limiting protection device includes diodes (D1, D2). The diodes (D1, D2) are placed in opposite directions because the current is alternating and must be limited in both directions.

Figure 9:
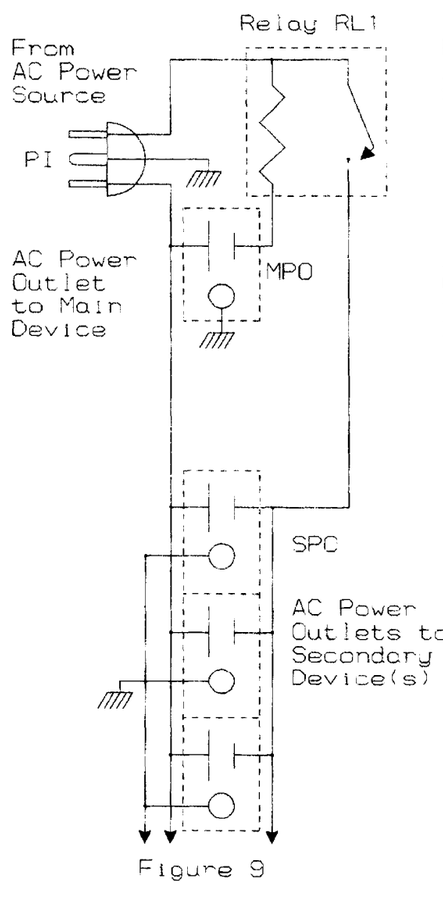
FIG. 9 is a view showing the inventive device in accordance with still a further embodiment of the present invention.
Figure 10:
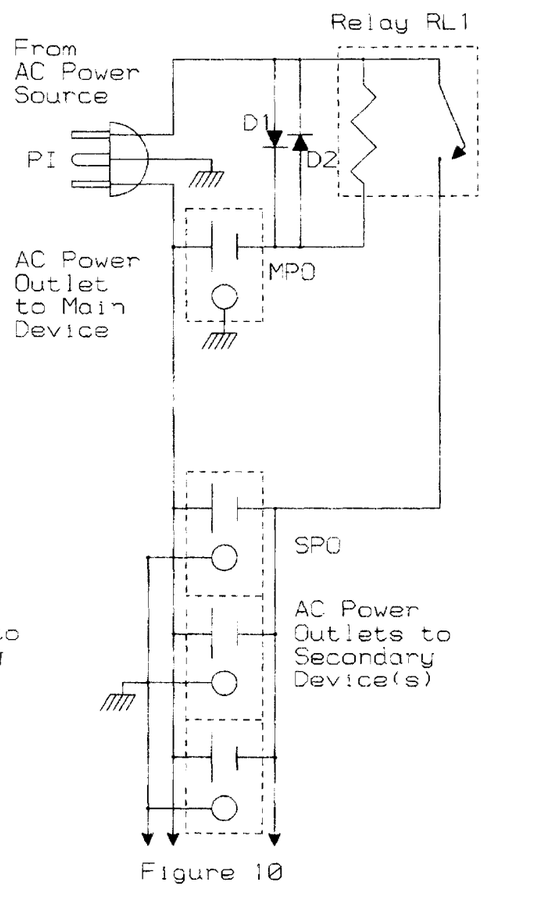
FIG. 10 is a view substantially corresponding to the view of FIG. 10 but showing a modification of the device of FIG. 9.

FIG. 9 shows a further embodiment of the present invention. This embodiment is substantially similar to the embodiment of FIG. 7. The difference is that the current driven relay (RL1) is replaced in the embodiment of FIG. 9 with a thermal relay that can be made with, for example, a bimetallic switch. The current drawn by the main device is converted to heat. When the heat reaches the threshold determined by the mechanical configuration (RL1), it will cause the relay (RL1) to close. When the relay (RL1) closes, it supplies power to the secondary device (S). Such an approach is better than the use of the magnetic relay, because a thermal device has an inherent time delay. The time delay in turning on and off the secondary device (S) will help prevent false turn ons and turn offs. As with the magnetic relay, the heating element should withstand the full current of the strip. Alternatively, as shown in FIG. 10, power limiting devices like diodes (D1, D2) can be used again for the same reason as in FIG. 8.

It is to be understood that the device in accordance with the present invention can be used on many different voltages, including but not limited to 100, 120 and 220 Vac, for domestic and international use.

Instead of the triac (Q1) transistors or other switching devices can be used. Also, separate diodes can be used instead of the diode bridges. The diodes (D1) also can be replaced by any voltage limiting device.

Figure 11:
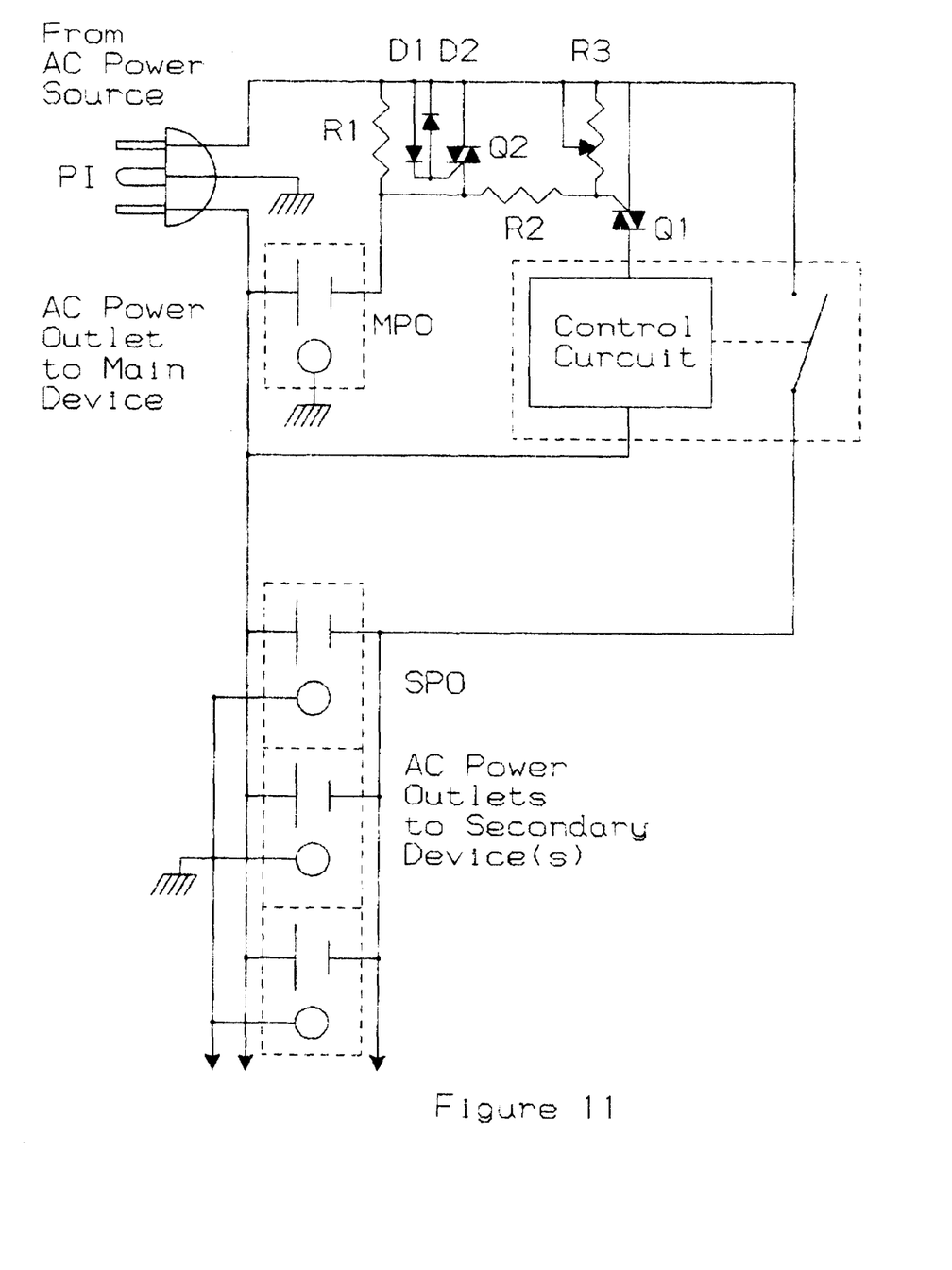
FIGS. 11, 12 and 13 show three further embodiments of the present invention.
Figure 12:
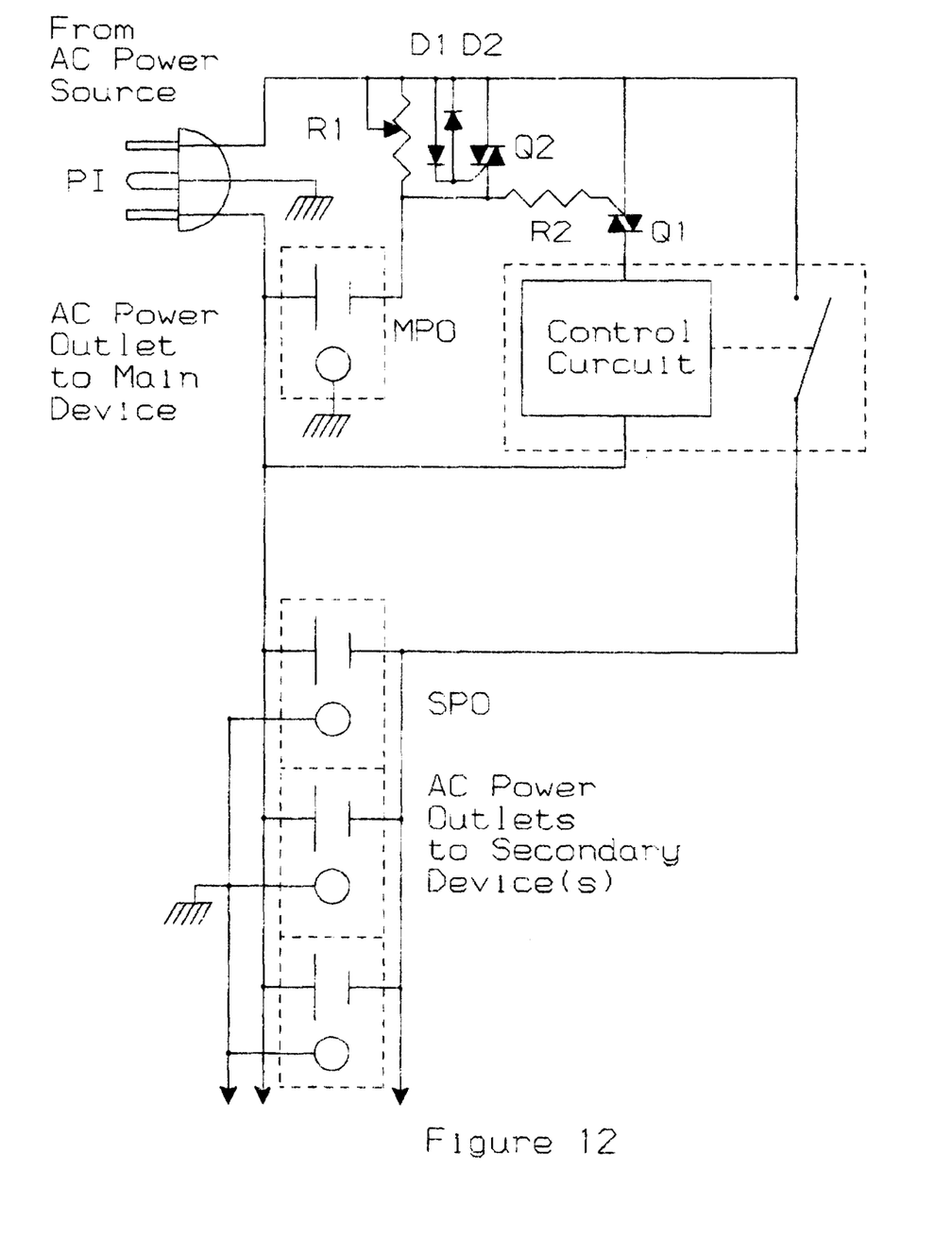

FIGS. 11 and 12 show two further embodiments of the present invention. The general construction of the devices in these figures. substantially correspond to the construction of the device shown in FIG. 3. However, the devices shown in FIGS. 11 and 12 are provided with means for adjusting the threshold of the current level, which is used for comparing the actual current level and turning off and on of the secondary device when the actual current level falls below or raises above the threshold respectively. In the embodiment of FIG. 11 the threshold adjusting means include an additional resistor (R3) arranged before the triac ($Q_1$) and a potentoimeter which adjust the voltage across the resistor ($R_3$). In the embodiment of FIG. 12 the threshold adjusting means include a potentiometer which is associated with the resistor (R1) and adjust the voltage across this resistor.

Figure 13:
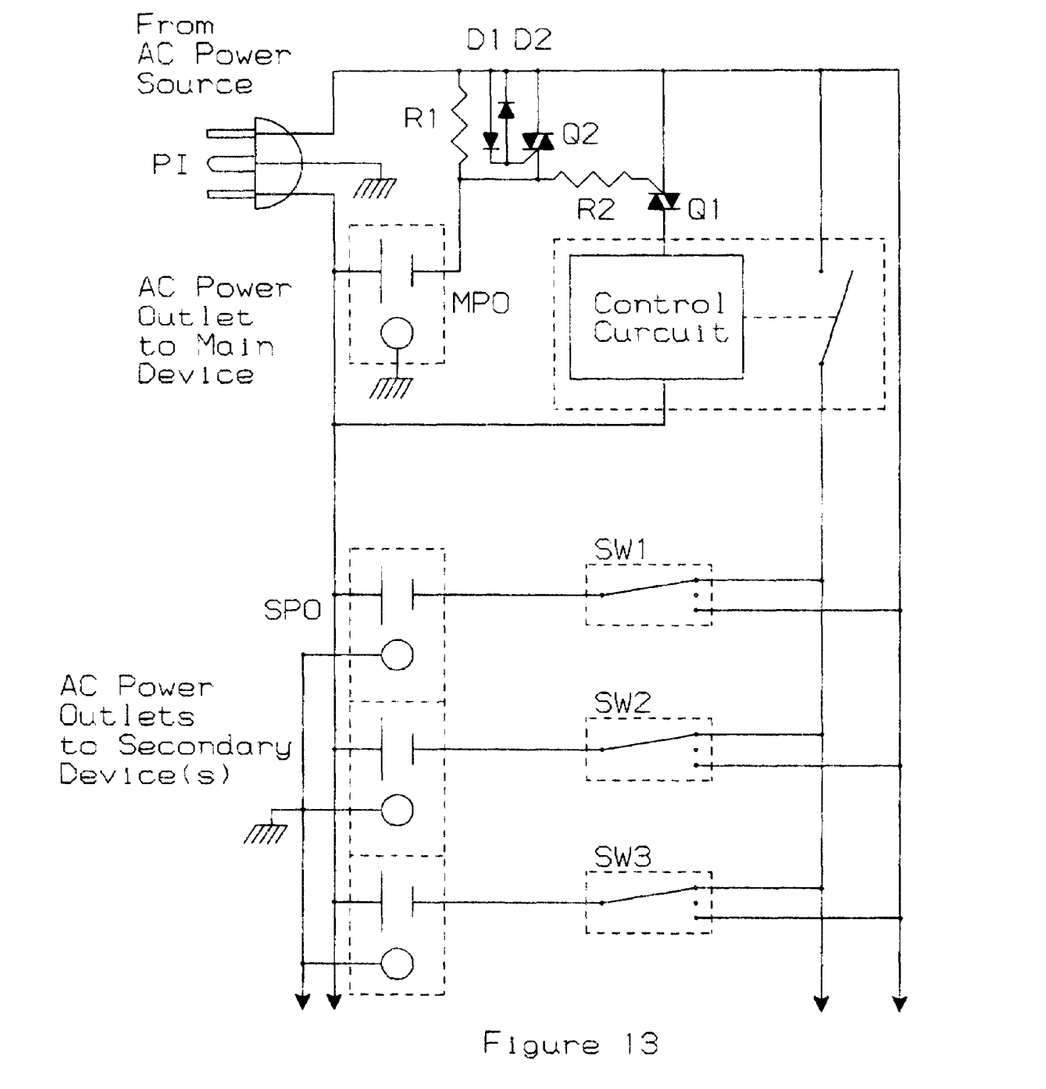

In the embodiment shown in FIG. 13 each secondary device is provided with a switch (SW1), (SW2), (SW3), which is turnable between the positions OFF, ON and CONTROL. In these positions the corresponding secondary device is turned off, turned on, or connected with the control circuit correspondingly.

It will be understood that each of the elements described above, or two or more together, may also find a useful application in other types of constructions differing from the types described above.

While the invention has been illustrated and described as embodied in device for controlling power distribution to subsystems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A device for controlling a power distribution to subsystems, comprising a power input to be connected to a power source, a primary power output to be connected to a primary device; at least one secondary power output to be connected to at least one secondary device; sensing means for sensing when a current level falls below a threshold in response to the primary device being turned off and when the current level raises above a threshold in response to the primary device being turned on; and executing means operatively connected with said sensing means and operative for interrupting a power supply to said at least one secondary device when the sensing means sense the current level below the threshold and supplying power to said at least one secondary device when said sensing means sense the current level above the threshold correspondingly; and means for limiting voltage across said sensing means so as to limit heat produced by said sensing means but at the same time to allow tripping of said sensing means, said voltage limiting means including a gate element connected parallel with said sensing means, said voltage limiting means including means for ensuring that said sensing means first acts on said executing means, and only thereafter said gate element limits the voltage of said sensing means.

2. A device as defined in claim 1, wherein said sensing means including a sensing resistor, said gate element including a triac connected parallel with said sensing resistor.

3. A device as defined in claim 1, wherein said ensuring means include a diode element connected between a sensing resistor of said sensing means and said gate element.

4. A device defined in claim 3, wherein said diode element include two diodes which are inverted relative to one another.

5. A device as defined in claim 1; and further comprising time delay means which is located between said sensing means and said executing means and is operative for delaying interruption of power or supply of power to the at least one secondary device in response to the sensing of the current level below the threshold or above the threshold by the sensing means correspondingly.

6. A device as defined in claim 4, wherein said time delay means include a capacitor and resistors located between said sensing means and said executing means.

7. A device as defined in claim 1, wherein said executing means includes a DC relay.

8. A device as defined in claim 1, wherein said executing means includes a mechanical AC relay.

9. A device as defined in claim 1, wherein said executing means includes a solid state AC relay.

10. A device as in claim 1; and further comprising means for adjusting the threshold.

11. A device as in claim 1; and further comprising a switch connectable with each secondary device and turning the latter on, off, or for control.

12. In combination with an electrical power source a primary device, and at least one secondary device, a device for controlling a power distribution comprising a power input to be connected to the power source; a primary power output to be connected to the at least one secondary device; sensing means for sensing when a current level falls below a threshold in response to the primary device being turned off and when the current level raises above a threshold in response to the primary device being turned on; and executing means operatively connected with said sensing means and operative for interrupting a power supply to said at least one secondary device when the sensing means sense the current level below the threshold and supply power to said at least one secondary device when said sensing means sense the current level above the threshold; and means for limiting voltage across said sensing means so as to limit heat produced by said sensing means but at the same time to allow tripping of said sensing means.

13. The combination as defined in claim 12; and further comprising means for adjusting the threshold.

14. A device for controlling a power distribution to subsystems, comprising a power input to be connected to a power source, a primary power output to be connected to a primary device; at least one secondary power output to be connected to at least one secondary device; sensing means for sensing when a current level falls below a threshold in response to the primary device being turned off and when the current level raises above a threshold in response to the primary device being turned on; and executing means operatively connected with said sensing means and operative for interrupting a power supply to said at least one secondary device when the sensing means sense the current level below the threshold and supplying power to said at least one secondary device when said sensing means sense the current level above the threshold correspondingly; and means for limiting voltage across said sensing means so as to limit heat produced by said sensing means but at the same time to allow tripping of said sensing means, said sensing means including a current sensing resistor arranged in series with said primary power output, and a triac connected to said resistor and to said executing means.

15. A device defined in claim 14, wherein said current sensing resistor is formed so as to convert current into voltage; and further comprising means for limiting voltage across said current sensing resistor.

* * * * *